(12) United States Patent
Mahaffy (10) Patent No.: US 7,799,256 B2
(45) Date of Patent: Sep. 21, 2010

(54) METHODS OF MANUFACTURING MOLDS AND PARTS

(75) Inventor: Matthew James Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 11 days.

(21) Appl. No.: 12/185,911

(22) Filed: Aug. 5, 2008

(65) Prior Publication Data

US 2010/0032863 A1 Feb. 11, 2010

(51) Int. Cl.
*B29C 33/40* (2006.01)

(52) U.S. Cl. .................. 264/219; 264/220; 264/318

(58) Field of Classification Search .......... 264/219, 264/220, 227, 318
See application file for complete search history.

(56) References Cited

U.S. PATENT DOCUMENTS

| | | | |
|---|---|---|---|
| 4,641,270 A * | 2/1987 | Lalloz et al. .......... 700/98 |
| 5,580,507 A | 12/1996 | Williamson et al. | |
| 5,976,457 A | 11/1999 | Amaya et al. | |
| 6,155,331 A | 12/2000 | Langer et al. | |
| 6,156,250 A | 12/2000 | Torres et al. | |
| 6,998,089 B2 | 2/2006 | Osaki | |
| 7,125,512 B2 | 10/2006 | Crump et al. | |
| 2002/0187065 A1 | 12/2002 | Amaya et al. | |
| 2003/0011106 A1 | 1/2003 | Osaki | |
| 2005/0285314 A1 | 12/2005 | Macke, Jr. et al. | |
| 2005/0287031 A1 | 12/2005 | Macke, Jr. et al. | |
| 2006/0001190 A1 | 1/2006 | Priedeman, Jr. et al. | |

* cited by examiner

*Primary Examiner*—Joseph S Del Sole
*Assistant Examiner*—James Sanders
(74) *Attorney, Agent, or Firm*—Dinsmore & Shohl LLP (57) ABSTRACT

Methods of manufacturing molds and parts include generating a computer representation of a master part, determining an undercut region of the master part, generating a computer representation of a core to fill the undercut region, manufacturing a master part assembly having a master part and an embedded core, manufacturing a master mold core, creating a master mold using the master part assembly, placing the master mold core in the master mold and manufacturing a prototype part.

12 Claims, 8 Drawing Sheets

METHODS OF MANUFACTURING MOLDS AND PARTS

TECHNICAL FIELD

The present invention generally relates to methods of making molds and parts for these molds.

BACKGROUND

During prototyping automobiles, master parts are made. The purpose of making such master parts is so that master molds can then be made, and prototype parts can be made through such master molds. In constructing the initial master part, attention should be paid to undercuts on the part (e.g., sharp aspects of the part) that would keep the part from being removed from the master mold during construction of the master mold, and therefore potentially damaging the master mold. To minimize issues of undercuts of the master part, a core (usually made of putty or aluminum) is generally fabricated for fit with the master part at the undercut so that the sharp aspect is lessened and does not interfere with the master mold creation process. To make a core the traditional way, the master part is created and the core is either cast directly on the master, or a core is fabricated using common shop tools. Both of these methods require a significant amount of time and that the master part to be finished first and then a core be fit to the master.

Accordingly, methods for making molds and parts for molds are desired.

SUMMARY

According to one embodiment, methods of manufacturing master molds include generating a computer representation of a master part, determining an undercut region of the master part, generating a computer representation of a core to fill the undercut region, manufacturing a master part assembly having a master part and an embedded core and creating a master mold using the master part assembly.

According to another embodiment, methods of manufacturing prototype parts include generating a computer representation of a master part, determining an undercut region of the master part, generating a computer representation of a core to fill the undercut region, manufacturing a master part assembly having a master part and an embedded core, manufacturing a master mold core, creating a master mold using the master part assembly, placing the master mold core in the master mold and manufacturing a prototype part.

These and additional features can be more fully understood in view of the following detailed description, in conjunction with the drawings.

BRIEF DESCRIPTION OF THE DRAWINGS

The embodiments set forth in the drawings are illustrative and exemplary in nature and not intended to be limited of the inventions defined by the claims. Moreover, the individual features of the drawings will be more fully apparent and understood in view of the detailed description. The following detailed description of specific embodiments of the present invention can be best understood when read in conjunction with the following drawings, where like structure is indicated with like reference numerals and in which:

DETAILED DESCRIPTION

As described herein, methods for manufacturing molds for prototype parts generally include generating a computer representation of the master part, determining undercut regions of the master part, generating a computer representation of a core to fill the undercut regions, manufacturing the master part with embedded core, manufacturing a separate core, creating a master mold using the master part with embedded core, placing the separate core in the master mold and manufacturing a prototype part. Each of these steps and the parts and components derived from each step will be more fully discussed below.

Referring to the figures, methods described herein to create a prototype part generally begin with generation of a computer representation of the master part in a CAD type design database 10. In the embodiment illustrated in the drawings, the intended prototype part 130 is a component for an automobile seat, however, it should be understood that any prototype part can be manufactured with the methods described herein. Once the computer representation of the master part is generated, any undercut regions associated with the master part can be determined 20. Undercut regions generally include regions associated with the master part to be produced that are likely to stick to the silicone mold during production of the mold and/or removal of the master part from the mold (described later herein). Such undercut regions can damage the master mold during removal of the master part from the master mold. As illustrated in the figures, prototype part 130 includes an arm 132 and clip assembly 134 having a clip (e.g., clip is not shown, but includes the opposite image of core 113, which represents one potential undercut region). Because this clip 134 is likely to stick to or catch a portion of the master mold, such as during removal of the master part from the master mold, the clip (and, in one embodiment, its immediate surroundings) could be determined to be an undercut region.

Once the undercut regions are determined, computer representations of master part cores for association with the undercut regions 107 may be generated 30. For example, as illustrated in the figures, a master part core generated in CAD may substantially match the shape or contour of the undercut and be utilized to effectively fill or effectively eliminate the presence of the undercut region 107 (e.g., the clip assembly 134) that would otherwise exist in a manufactured master part. In addition, while an inner portion (e.g., computer representation thereof) of the master part core may match the undercut region 107, an outer surface of the master part core may be smooth so that a smooth cavity is ultimately formed in the master mold (discussed later herein with respect to FIG. 3). Accordingly, the CAD computer representation may comprise a master part with the embedded core that will ultimately yield a master part with undercut regions being occupied by cores. In addition, the CAD program may also be used to generate a representation of a manufactured master mold core 40 (e.g., 113 in FIGS. 4-6), which is utilized to engage the cavity in the master mold formed by the master part core 120, as will be discussed later herein.

Once the digital CAD file reflects the design of the master part and the master part core, the CAD file is used in conjunction with the creation of solid 3D patterns through existing technologies (CNC, SLA, SLS, LOM, etc.), to create the master part with embedded master part core 50 and to create a separate master mold core 60 representing the core utilized to occupy the region or cavity created by the master part core. For example, stereolithography (SLA) can be used as one embodiment for the production of 3D solid replicas, models or patterns. SLA stands for Stereolithography Apparatus. Such equipment utilizes the CAD data to guide an ultraviolet laser over a vat of photosensitive polymer to cure or solidify the polymer to yield a solid object. Other methods known in the art may be similarly used.

Figure 2:
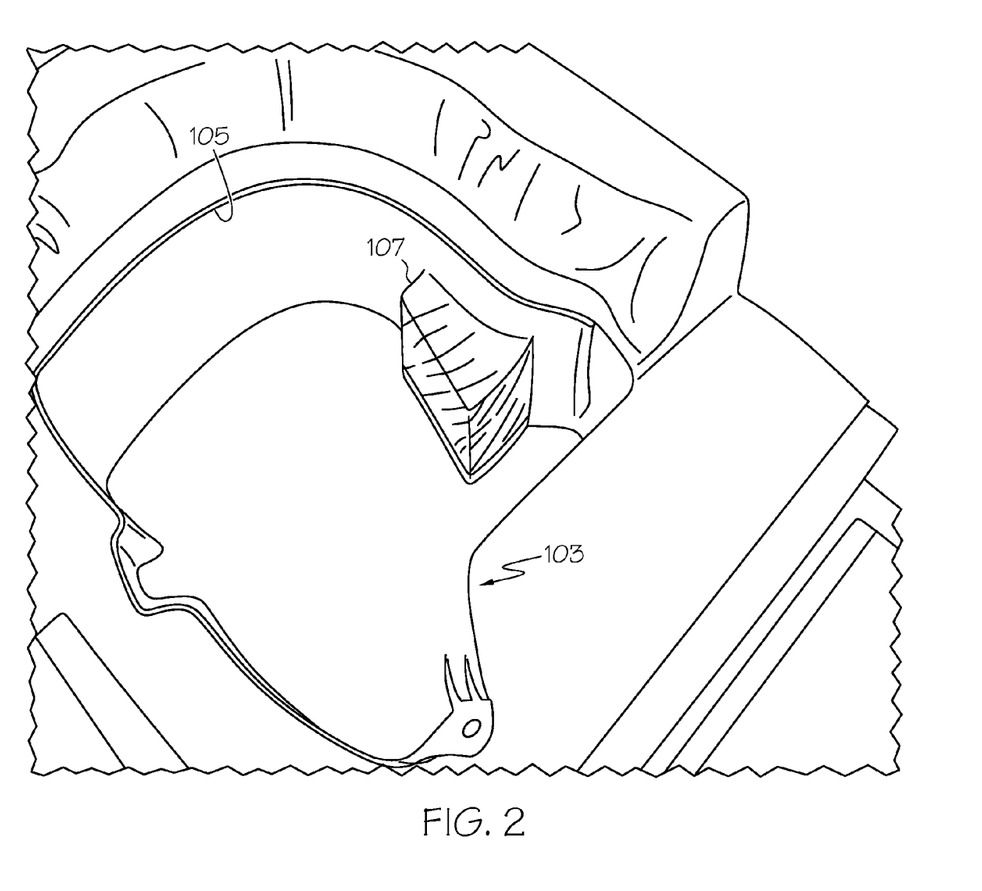
FIG. 2 is a perspective view of a master part assembly with core according to one or more embodiments of the present invention.
Figure 3:
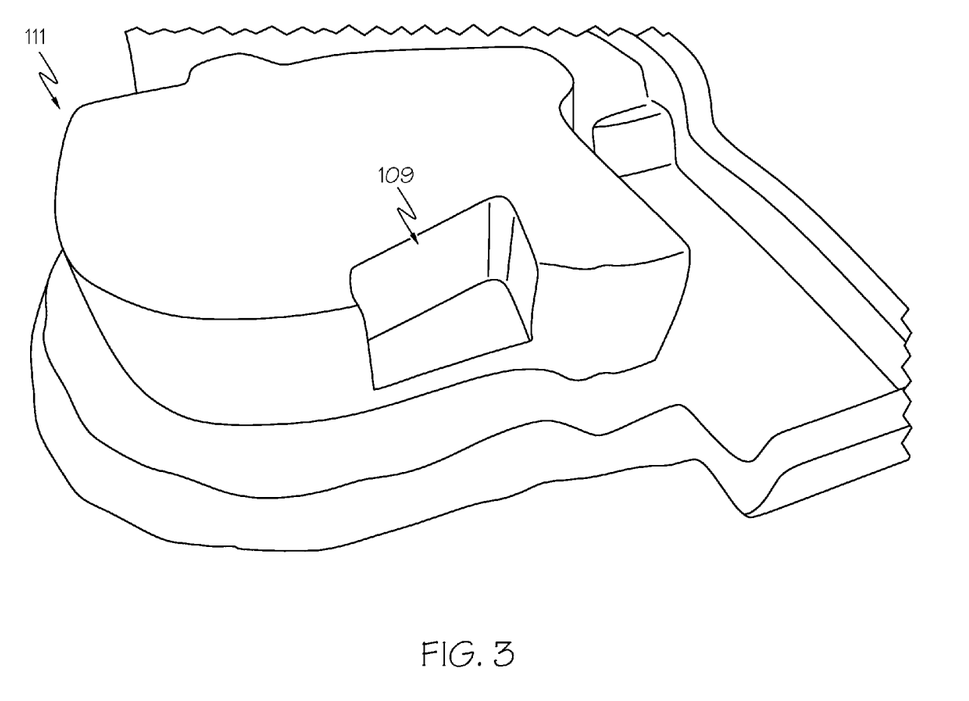
FIG. 3 is a perspective view of a master mold with cavity according to one or more embodiments of the present invention.

Referring to FIGS. 2-3, a master part assembly 103 (e.g., a master part 105 with embedded master part core 107) is illustrated. As discussed herein, such a master part assembly 103 can be utilized to create a master mold (e.g., a silicone mold or tool) for use in manufacturing prototype parts. For example, as illustrated, the master part assembly 103 (e.g., which was originally a computer representation in CAD) comprises the master part 105 with an embedded master part core 107. In another embodiment, a separate master part core 107 may be physically placed with the master part 105. The master part core 107 effectively eliminates the undercut region comprising the clip of the clip assembly (e.g., 134 in FIG. 8). When silicone is poured into and/or within master part assembly 103, a cavity 109 is effectively formed within the master mold 111.

Figure 4:
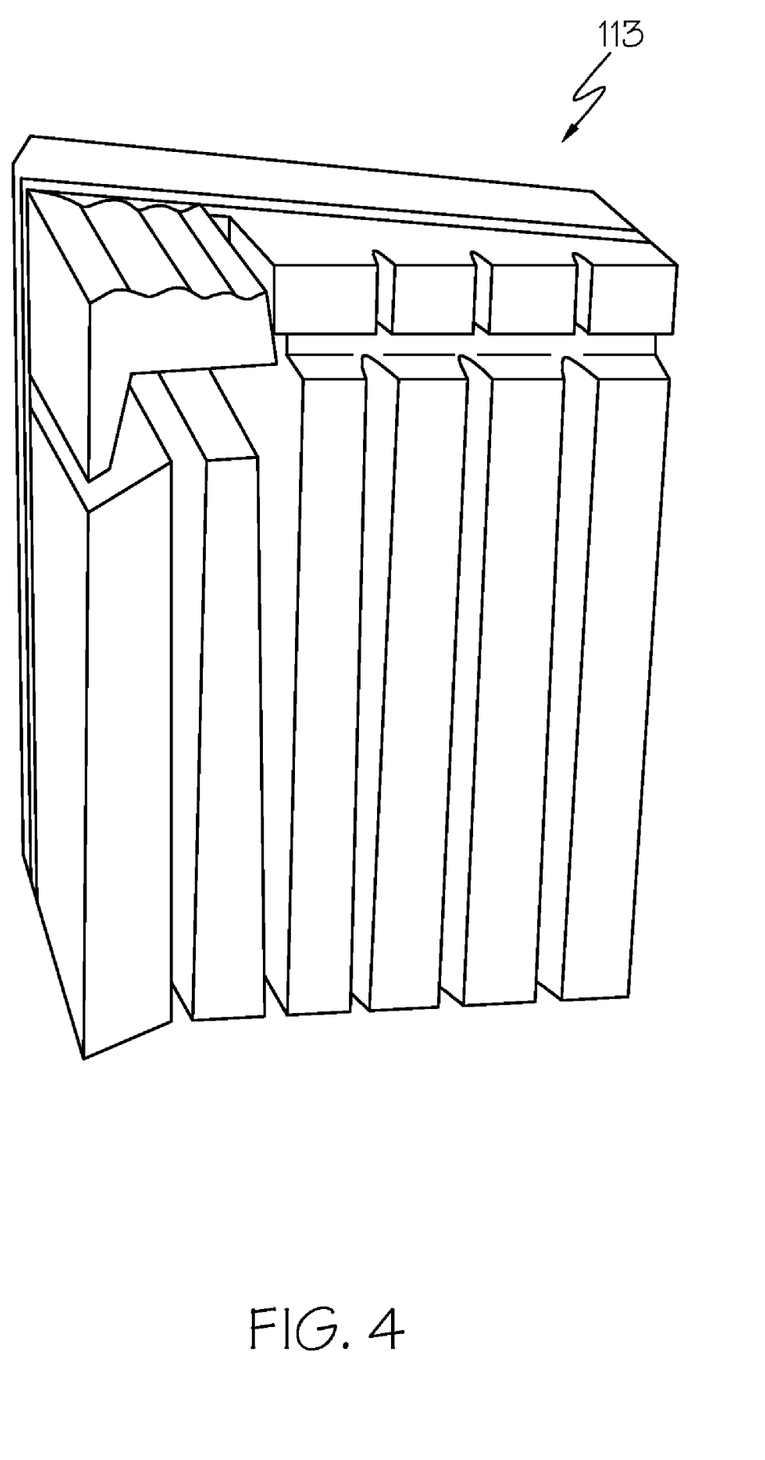
FIG. 4 is a perspective view of a master mold core according to one or more embodiments of the present invention.
Figure 5:
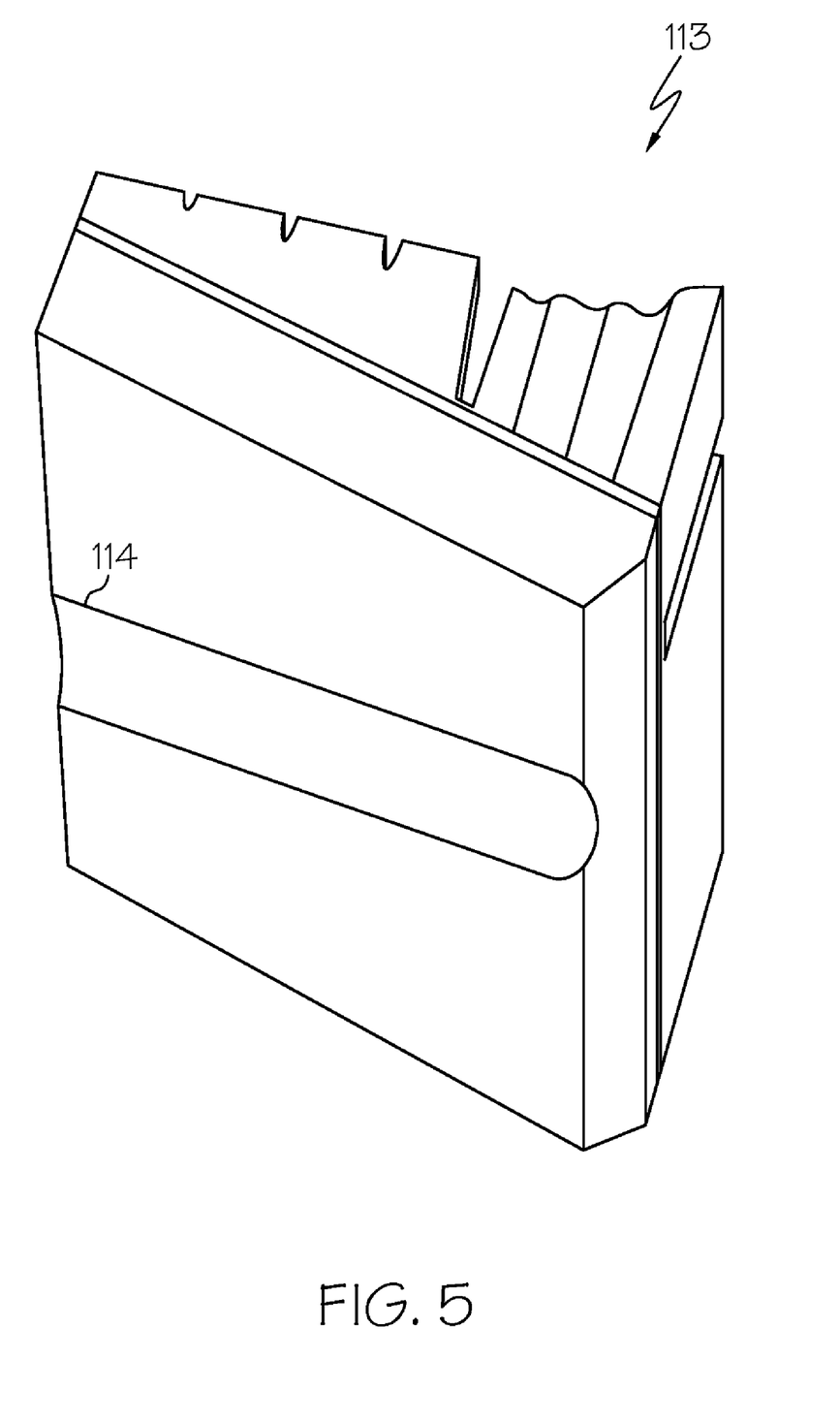
FIG. 5 is a perspective view of a master mold core according to one or more embodiments of the present invention.
Figure 6:
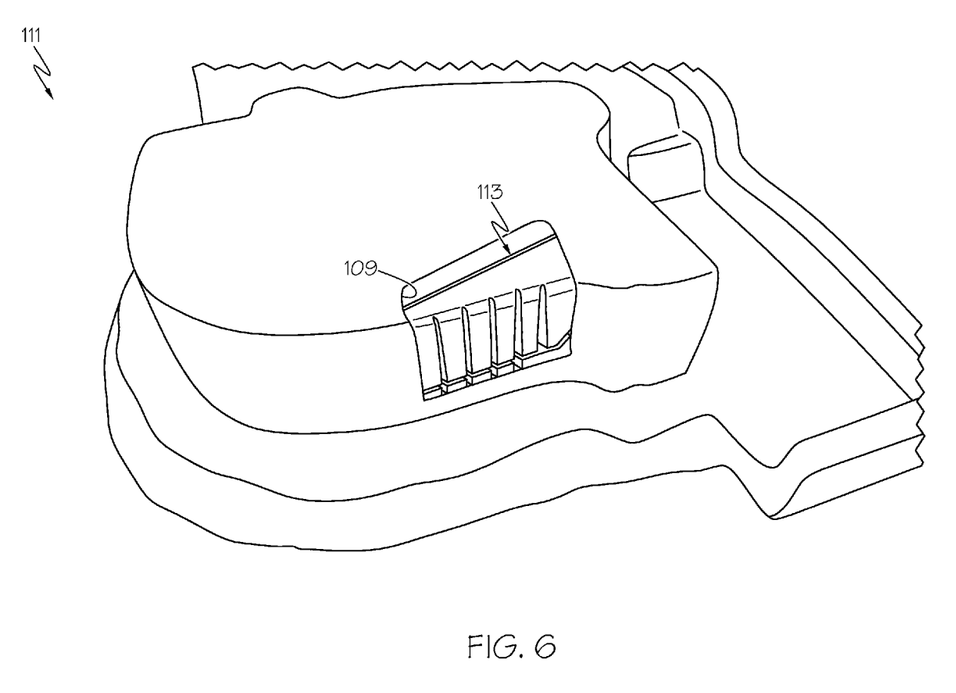
FIG. 6 is a perspective view of a master mold with core according to one or more embodiments of the present invention.

Referring to FIGS. 4-6, the master mold core 113 is illustrated alone (e.g., FIGS. 4-5) and assembled or engaged with the master mold 111 (e.g., FIG. 6). Referring to FIGS. 4-5, master mold core 113 may comprise the details and features of an undercut region to be formed in a prototype part. For example, as illustrated in FIGS. 4-5, details of master mold core 113 may resemble the shape of a resulting clip of a clip assembly 134 associated with the finished prototype part or component.

Figure 1:
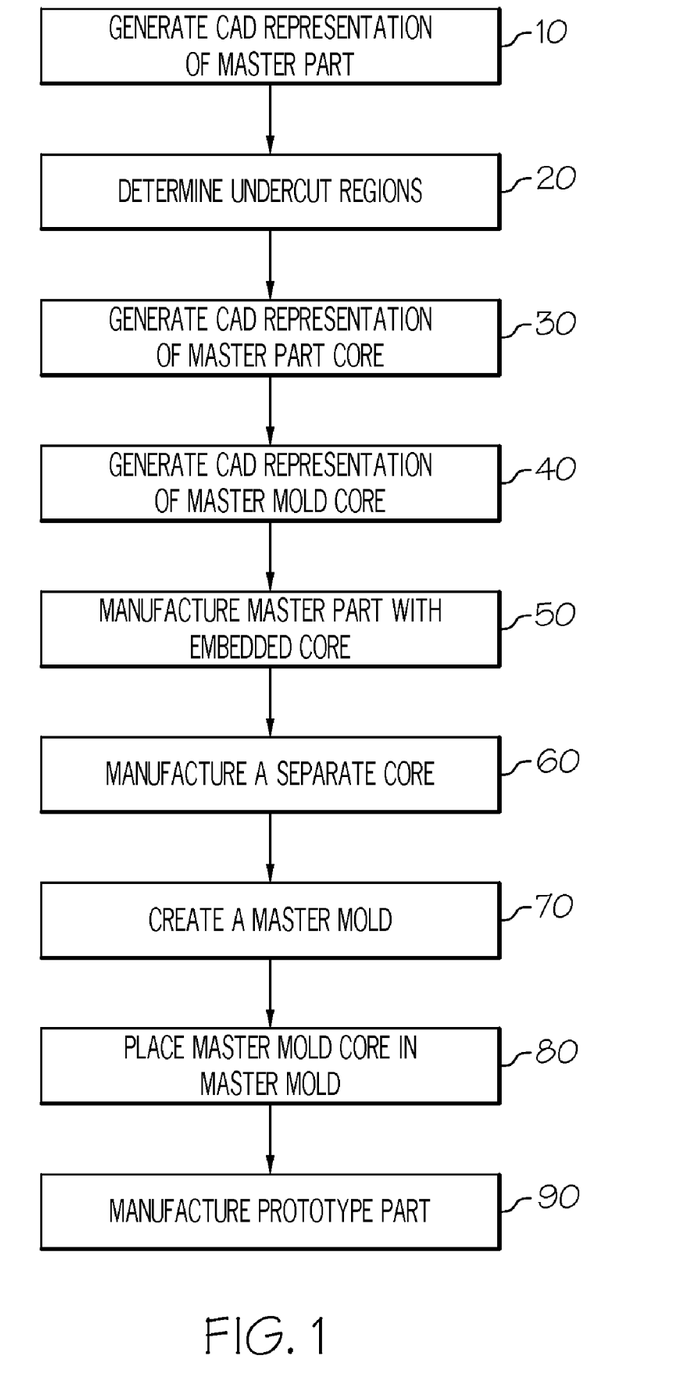
FIG. 1 is schematic process flow chart of a method according to one or more embodiments of the present invention.
Figure 7:
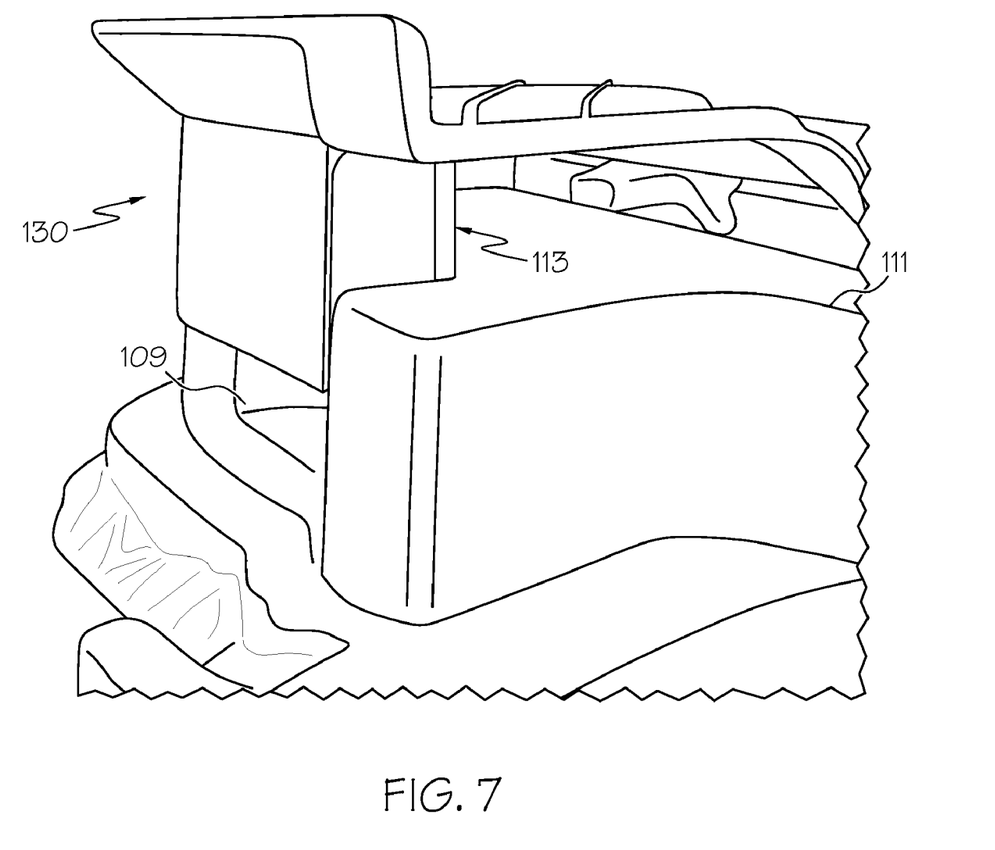
FIG. 7 is a perspective view of a prototype part and master mold according to one or more embodiments of the present invention.
Figure 8:
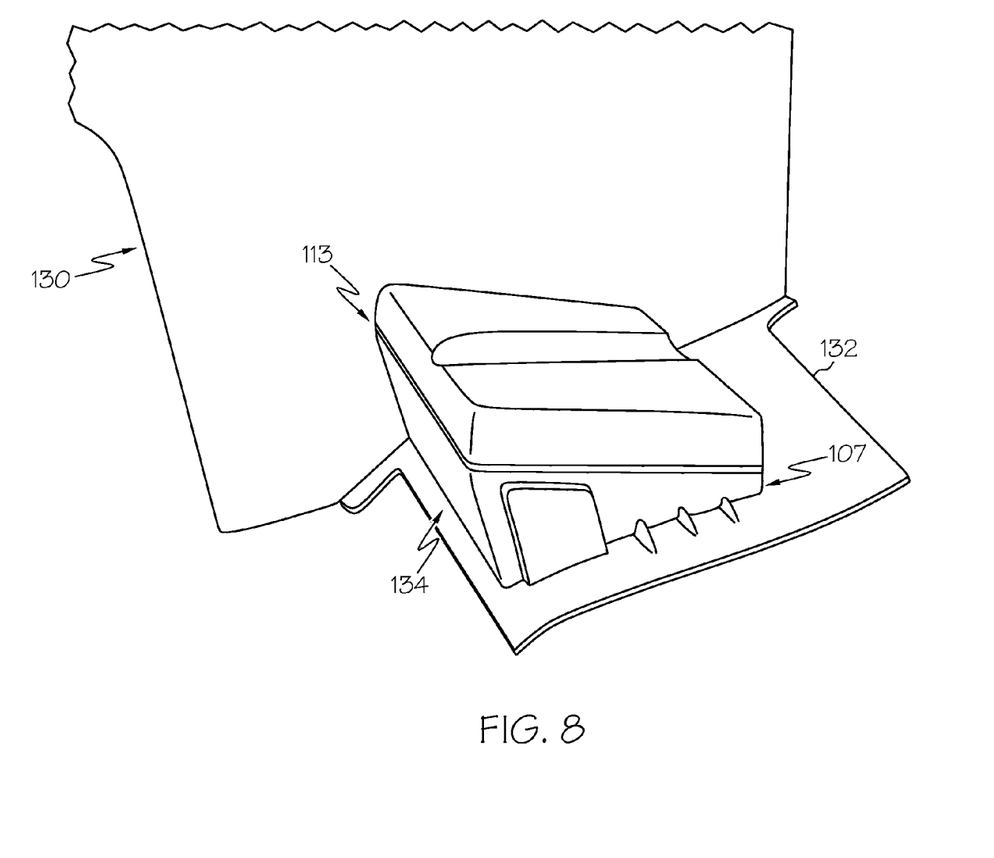
FIG. 8 is a perspective view of a prototype part and master mold according to one or more embodiments of the present invention.

Referring again to FIG. 1 and as illustrated in FIG. 6, master mold core 113 may be placed or positioned 80 within cavity 109 of master mold 111. As illustrated in FIG. 5, master mold core 113 may comprise a retention component 114 for securing the master mold core 113 to the master mold 111. When a production or prototype part (e.g., 130 in FIGS. 7-8) is created 90 with the master mold 111, such as by injecting urethane in the mold, the urethane takes the shape of the master mold 111, including the shape of the master mold core 113 (e.g., clip). As illustrated in FIGS. 7-8, the prototype part 130 may be removed from the master mold 111, such that the master mold core 113 similarly is removed from the cavity 109 of the master mold 111. As illustrated in FIG. 8, master mold core 111 with retention component 114 may remain within undercut region 107 (e.g., located on arm 132 of prototype component 130) until removed. In another embodiment, master mold core can remain affixed to the master mold 111 when the prototype part is removed from the mold. The master mold core 113 may be removed and utilized in subsequent prototype manufacturing processes utilizing master mold 111. In addition, a plurality of master mold cores can be produced as discussed above to replace master mold core 113 after any number of cycles, such as when master mold core 113 begins to wear, which can happen after repeated cycles.

Accordingly, methods described herein can streamline the process for production of prototype parts. For example, by creating a master part assembly with a master part core embedded therein, the need for finishing of a master part in order to eliminate or reduce an undercut prior to creating the master mold is significantly, if not completely, eliminated. In addition, as master mold cores begin to wear down from repeated cycles of producing prototype parts, an extra master mold core, such as one manufactured during or subsequent to the master part assembly production process may be utilized to replace the existing master mold core.

The foregoing description of the various embodiments and principles of the inventions has been presented for the purpose of illustration and description. It is not intended to be exhaustive or to limit the invention to the precise forms disclosed. Many alternatives, modifications and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations and variations that have been discussed or suggested herein, as well as others that fall within the principles, spirit, and broad scope of the various inventions as defined by the claims.

What is claimed is:

1. A method of manufacturing a master mold comprising:
generating a computer representation of a master part;
determining an undercut region of the master part;
generating a computer representation of a core to fill the undercut region;
manufacturing a master part assembly having a master part and an embedded core;
creating a master mold using the master part assembly, the master mold including a cavity shaped as an inverse of the embedded core;
manufacturing a separate master mold core, wherein a portion of the master mold core matches the undercut region of the master part; and
placing the master mold core in the cavity of the master mold.

2. The method of claim 1 further comprising manufacturing a plurality of master mold cores.

3. The method of claim 2 wherein when one master mold core is worn, replacing the one master mold core with one of a plurality of master mold cores.

4. The method of claim 1 wherein the undercut region comprises at least a portion of a clip assembly for a seat component.

5. The method of claim 1 wherein the master mold is manufactured with silicone.

6. A method of manufacturing a prototype part comprising:
generating a computer representation of a master part;
determining an undercut region of the master part;
generating a computer representation of a core to fill the undercut region;
manufacturing a master part assembly having a master part and an embedded core;
manufacturing a separate master mold core, wherein a portion of the master mold core matches the undercut region of the master part;

creating a master mold using the master part assembly, the master mold including a cavity shaped as an inverse of the embedded core;

placing the master mold core in the cavity of master mold; and manufacturing a prototype part.

7. The method of claim 6 further comprising manufacturing a plurality of master mold cores.

8. The method of claim 7 wherein when one master mold core is worn, replacing the one master mold core with one of a plurality of master mold cores.

9. The method of claim 6 wherein the undercut region comprises at least a portion of a clip assembly for a seat component.

10. The method of claim 6 wherein the master mold is manufactured with silicone.

11. The method of claim 6 further comprising injecting urethane into the master mold to manufacture the prototype part.

12. The method of claim 6 wherein the master mold core comprises a retention component to selectively secure the master mold core to the master mold.

* * * * *